United States Patent [19]

Martindale et al.

[11] Patent Number: 5,551,742

[45] Date of Patent: *Sep. 3, 1996

[54] DUAL COMPOSITION BED LINER

[76] Inventors: Gerald A. Martindale, 4079 W. Cherry La., Meridian, Id. 83642; Lonnie D. Kuenzli, 755 Palmer, Eagle, Id. 83616

[ * ] Notice: The term of this patent shall not extend beyond the expiration date of Pat. No. 5,370,436.

[21] Appl. No.: 225,132

[22] Filed: Apr. 7, 1994

Related U.S. Application Data

[63] Continuation-in-part of Ser. No. 50,674, Apr. 21, 1993, Pat. No. 5,370,436.

[51] Int. Cl.$^6$ .................................................. B60R 13/01
[52] U.S. Cl. ............................................... 296/39.2
[58] Field of Search ................................ 296/39.1, 39.2; 104/423; 224/42.42

[56] References Cited

U.S. PATENT DOCUMENTS

| | | | |
|---|---|---|---|
| 4,333,678 | 6/1982 | Munoz et al. | 296/39.2 |
| 4,336,963 | 6/1982 | Nix et al. | 296/39.2 |
| 4,341,412 | 7/1982 | Wayne | 296/39.2 |
| 4,752,097 | 6/1988 | Van Kirk et al. | 296/39.2 |
| 4,944,612 | 7/1990 | Abstetar et al. | 296/39.2 |
| 4,986,590 | 1/1991 | Patti et al. | 296/39.2 |
| 5,257,848 | 11/1993 | Coletti et al. | 296/100 X |

FOREIGN PATENT DOCUMENTS

| | | | |
|---|---|---|---|
| 2257666 | 1/1993 | United Kingdom | 296/39.2 |

*Primary Examiner*—Joseph D. Pape

[57] ABSTRACT

A dual composition bed liner (10) is disclosed which includes a unitary side and front wall member (11) formed of a resilient plastic, such as polyethylene, and which has a rubber bed mat (18) integrally attached to the unitary wall member (11). A plurality of "C" shaped retaining tabs (19) are formed along the upper edge of unitary wall member (11) to engage the underside of truck bed rail (24). Each of the left side (11a), right side (11c) and front wall (11b) panels have a lip (13) extending inwardly from their bottom edges. A mat retaining ridge channel (14) is formed in the underside of the lip (13) to receive a retaining ridge (19) formed along the marginal edge of the upper surface of the bed mat (18). A plurality of rivet recesses (15) are provided in the top and bottom of retaining ridge (19) and are positioned to align with similar rivet recesses (15) in the mat ridge channel (14). Bed mat (18) is attached to unitary wall member (11) using nylon or similar non-marring rivets (16) which are countersunk, on at least the bottom surface, so they will not come in contact with pickup bed (25).

9 Claims, 10 Drawing Sheets

5,551,742

DUAL COMPOSITION BED LINER

This application is a continuation-in-part of application Ser. No. 08/050,674 filed Apr. 21, 1993, now U.S. Pat. No. 5,370,436.

BACKGROUND THE INVENTION

1. Technical Field

This invention generally relates to liners for the beds of pickup trucks. More particularly, this invention relates to a pickup truck bed liner having integrally formed resilient opposing plastic sidewalls, a front wall and a tailgate cover, which a non-skid bed cushion or mat is integrally attached to the bottom of the two sidewalls and the front wall.

2. Background Art

The current state of the art in truck bed liners is typified by U.S. Pat. No. 4,336,963 to Nix et al. and U.S. Pat. No. 4,752,097 to Van Kirk et al. These patents teach similar integrally formed liners made of polyethylene plastic or a similar material. Each liner has a pair of opposing sidewalls and a front wall formed integrally with the bottom bed panel. A separate tailgate cover is provided which is attached directly to the tailgate of the pickup truck.

One of the primary problems with these liners is that the plastic material has a very low coefficient of friction. While this aids in the loading and unloading of cargo, it frequently results in the cargo sliding around during transit which can result in damage to both the cargo and the truck bed.

At least one attempt has been made to design a pickup bed liner which includes a floor panel having a higher coefficient of friction. Abstetar et al., U.S. Pat. No. 4,944,612, teaches a four piece bed liner having the bottom floor panel manufactured from a combination of polyolefin thermoplastic and reclaimed rubber products. The primary drawback to this invention is that it is in four separate pieces, while a unitary or integral construction, with the bed panel attached, is preferred. Until now, there has been no way to construct a single piece bed liner having resilient plastic sidewalls and a rubber or similar composition floor panel.

Another problem with the traditional plastic single piece molded bed liners is a tendency of the liner to buckle or bubble in the middle of the floor panel as a result of their exposure to sunlight. This buckling causes a separation of the floor panel from the truck bed floor itself which allows debris to be blown under the bed liner due to the air turbulence created by the moving truck. Debris between the bed liner and truck bed cause abrasion resulting in rust and corrosion. This is such a problem that a number of truck manufacturers specifically exclude the truck bed from rust or corrosion protection in the truck warranty if a bed liner is used.

Accordingly, what is needed is a pickup truck bed liner of unitary construction, which includes a non-skid floor panel and which will prevent corrosion to the truck bed due to either contact with plastic or debris.

DISCLOSURE OF INVENTION

These needs are satisfied by a dual composition bed liner which includes a unitary side and front wall member formed of a resilient plastic, such as polyethylene, and which has a rubber bed mat integrally attached to the unitary wall member.

Each of the left side, right side and front wall panels have a lip or flange extending inwardly from their bottom edge. A downwardly facing mat retaining ridge channel is formed in the underside of the lip to receive a retaining ridge formed along the marginal edge of the upper surface of the bed mat. A plurality of rivet recesses are provided in the top and bottom of the retaining ridge and are positioned to align with similar rivet recesses in the mat ridge channel. The bed mat is attached to the unitary wall member using nylon or similar non-marring rivets which are countersunk, on at least the bottom surface, so they will not come in contact with the pickup bed.

A plurality of retaining tabs extend from the top edge of the unitary wall member and are configured to engage the underside of the truck bed rail to secure the liner in position. A separate tailgate cover panel is provided which includes a mat retention lip. The lip is positioned and configured to overlap the rear edge of the bed mat when the tailgate is in its up or closed position. This feature prevents air currents from lifting the back edge of the mat and allowing debris to come between the mat and the pickup bed surface.

A second embodiment of the invention has the left side and right side panels each constructed of two or more separate pieces which are riveted together. Additionally, the front wall can likewise be constructed from multiple panels which are integrally attached together. All of the individual panels are integrally and rigidly attached together to form a single unitary side and front wall member, which is functionally identical to the aforementioned unitary side and front wall member. The reason for providing a unitary side and front wall member which can be constructed from smaller panels is to facilitate shipment of the bed liner by a common carrier means, such as United Parcel Service. This particular carrier has a size limit which would prevent shipment of a complete unitary side and front wall member. However, the entire bed liner of the present invention can be shipped in kit form and assembled by either a retailer or the end user with great ease.

BEST MODE FOR CARRYING OUT INVENTION

Figure 1:
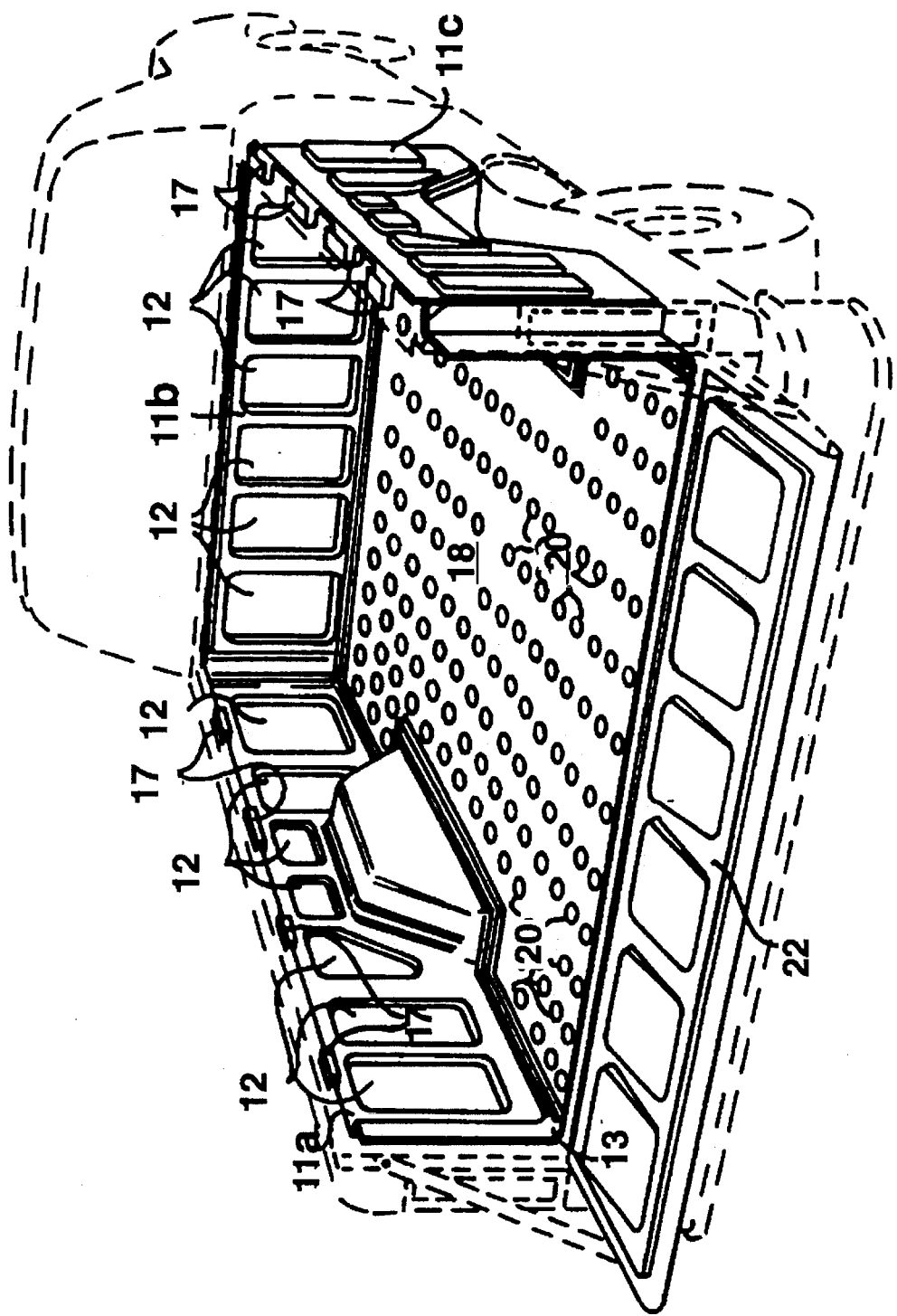
FIG. 1 is a perspective view of the dual composition bed liner installed in a pickup truck.
Figure 2:
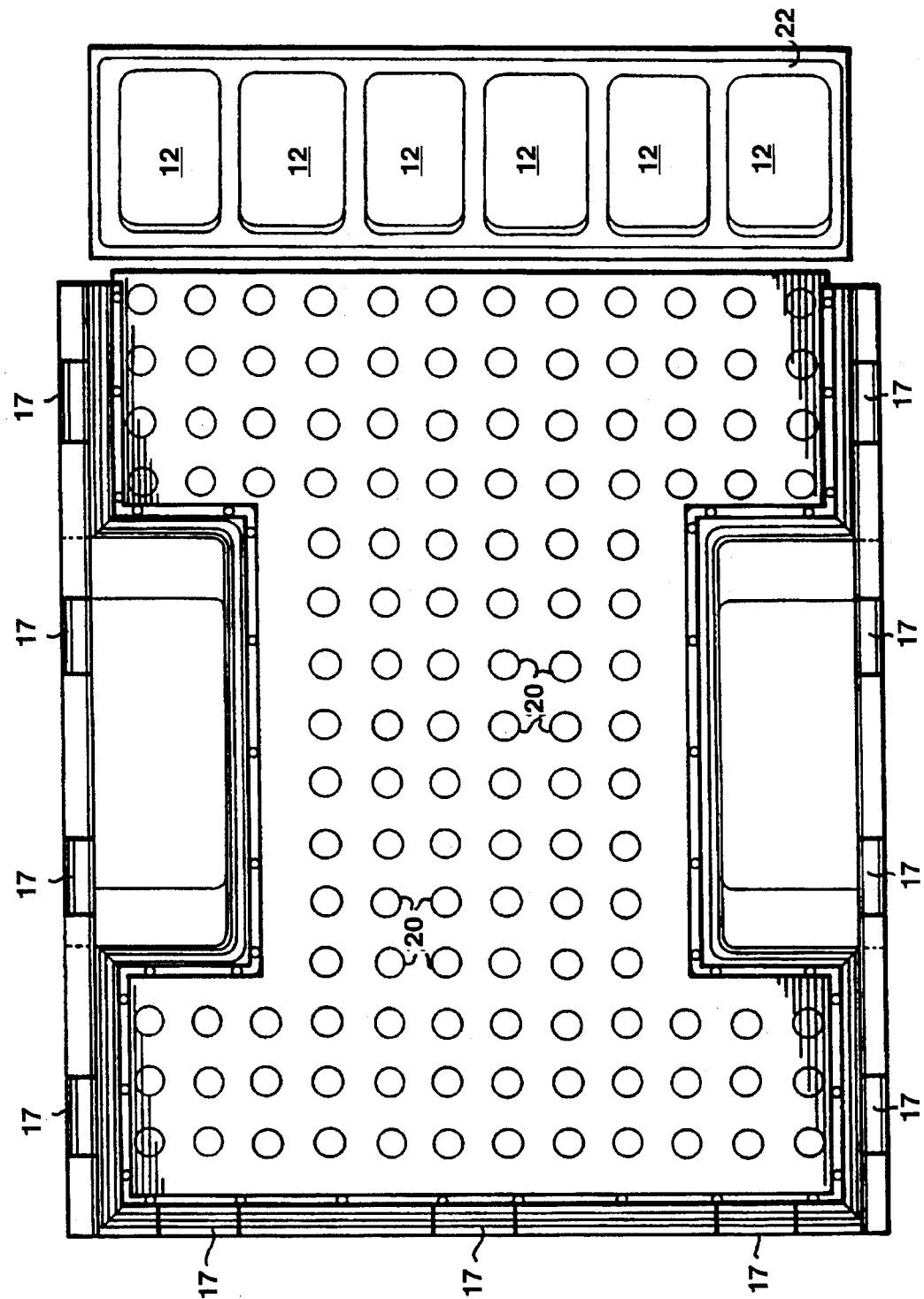
FIG. 2 is a top view of the dual composition bed liner and tailgate cover.
Figure 3:
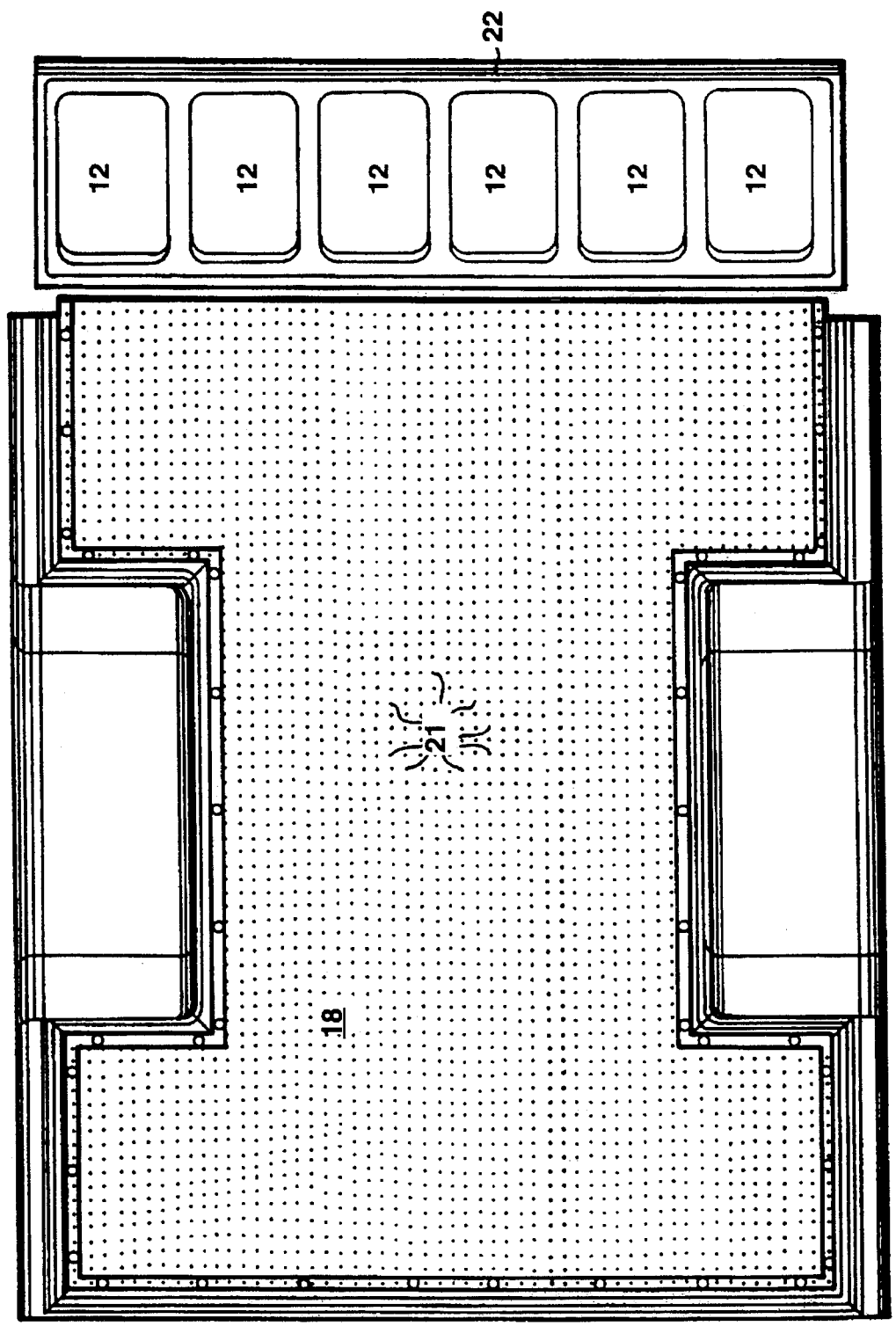
FIG. 3 is a bottom view of the dual composition bed liner and tailgate cover.
Figure 4:
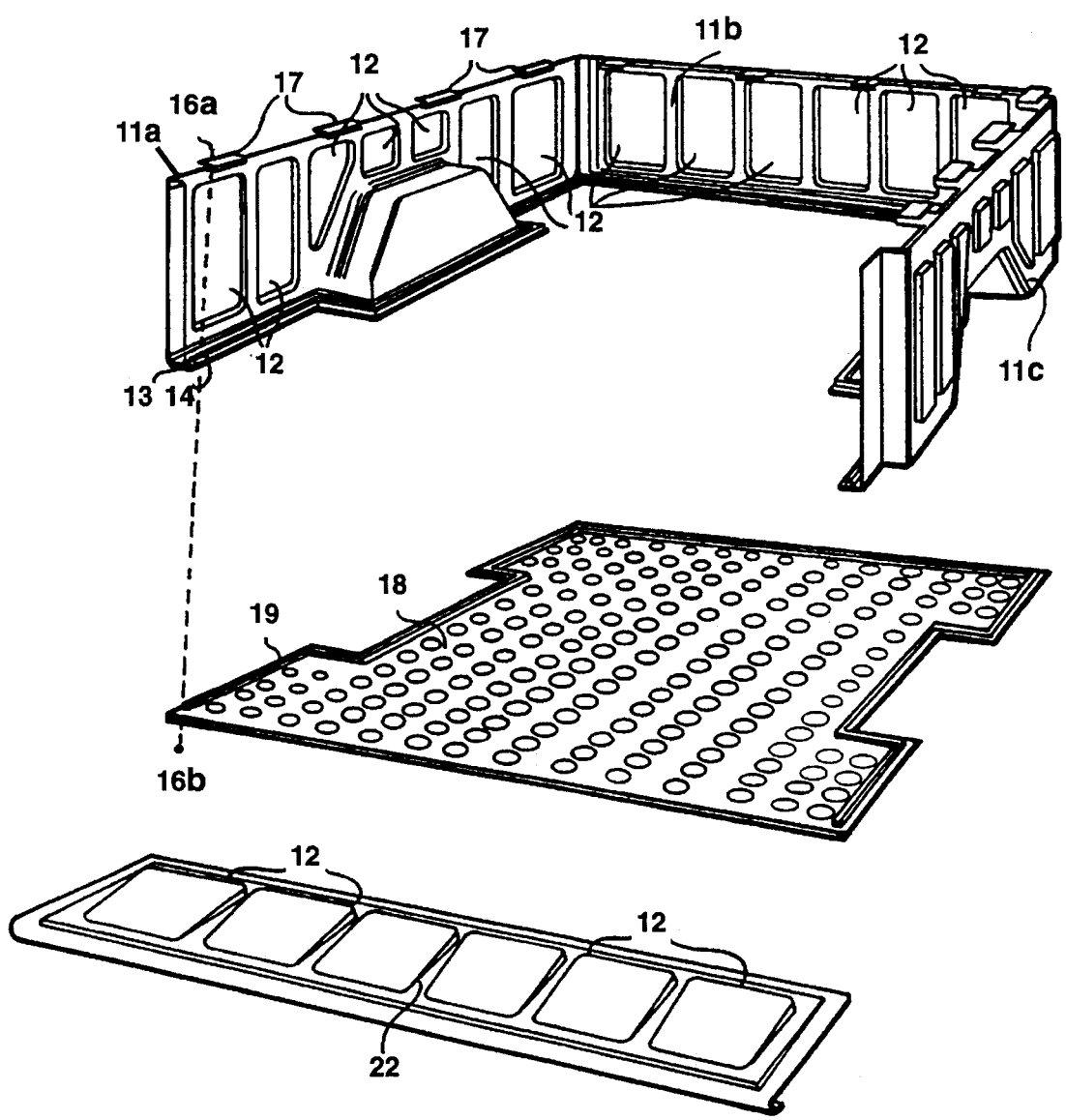
FIG. 4 is an exploded perspective view of the dual composition bed liner and tailgate cover.
Figure 5:
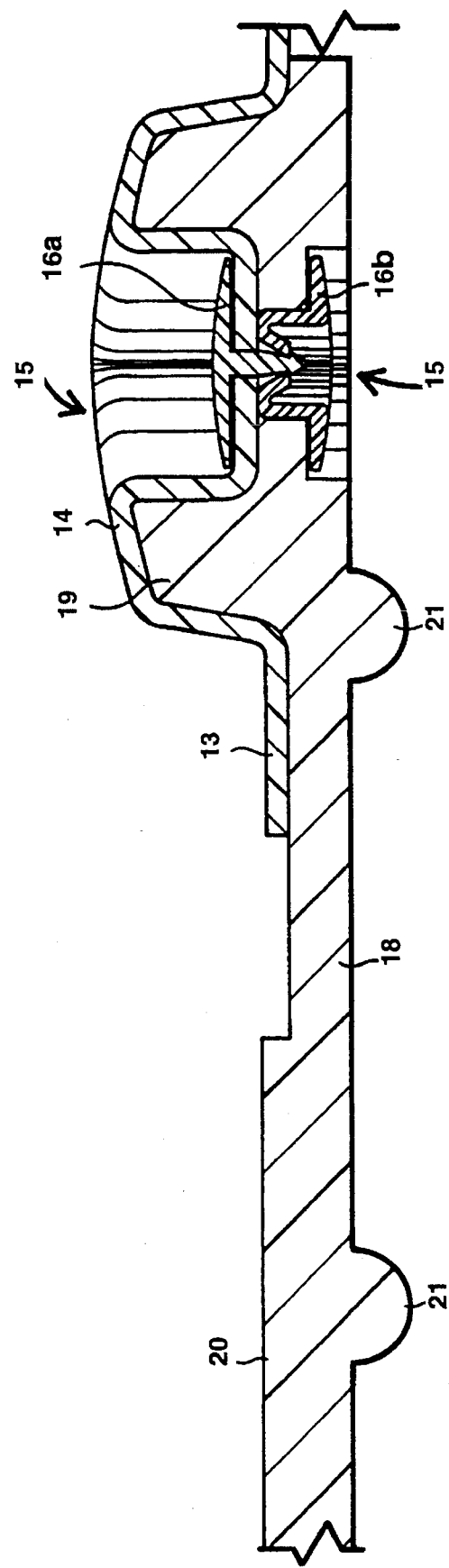
FIG. 5 is a partial cross section view showing the connection between the unitary wall member and the bed mat.

Referring now to the figures, a dual composition bed liner 10 is illustrated in detail. Dual composition bed liner 10 generally has a U-shaped unitary side and front wall member 11, which includes left sidewall 11a, front wall 11b and right sidewall 11c, to which a non-skid cushioning bed mat 18 is attached. Unitary wall member 11 has a lip or flange 13 extending inwardly from the bottom edges of left sidewall 11a, front wall 11b and right sidewall 11c. A downward facing channel, namely mat retaining ridge channel 14, is formed in the underside of bottom lip 13. Channel 14 runs continuously around the inside perimeter of unitary wall member 11. Rivet recesses 15 are periodically positioned in the upper surface along mat ridge channel 14 and sized to receive the male portion 16a of nylon rivet 16. Structural and cushioning formations 12, either protruding or recessed, are formed in the vertical portions of left sidewall 11a, front wall 11b and right sidewall 11c. These formations add structural rigidity to the side and front walls, and at the same time provide additional resiliency and shock absorption. Unitary wall member 11 is advantageously manufactured from a polyethylene plastic or similar material using vacuum forming or other conventional molding techniques.

Figure 6:
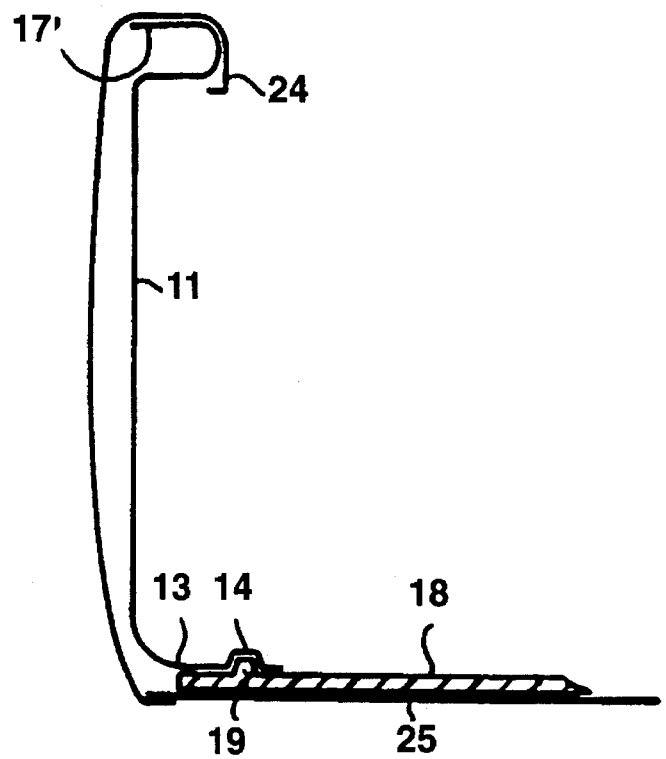
FIG. 6 is a partial sectional view showing how the liner fits under the pickup truck bed rail.

A plurality of "C" shaped retaining tabs 17 are formed along the upper edge of unitary wall member 11. Each retaining tab 17 is configured to engage the underside of truck bed rail 24, as is shown in detail in FIG. 6.

Bed mat 18 is constructed largely from a rubber-type material, that is to say any material having the same basic memory, cushioning and high coefficient of friction characteristics, to provide both a high coefficient of friction and high shock absorption properties. Retaining ridge 19 is formed on the upper surface of bed mat 18 around its marginal edges. Retaining ridge 19 is configured to engage mat ridge channel 14 and consequently has rivet recesses 15 formed periodically along its upper edge to cooperate with rivet recesses 15 in mat ridge channel 14. Rivet recesses 15, in both mat ridge channel 14 and retaining ridge 19, have through holes axially positioned within the recesses to receive the male portion 16a of the nylon rivet 16. Additional rivet recesses 15 are formed on the underside of bed mat 18 so that the female portion 16b of nylon rivet 16 is counter sunk and will not come into contact with truck bed 25. This configuration provides a mating interconnection between bed mat 18 and unitary wall member 11. It should be apparent that other mating interconnection configurations are possible and within the scope of the present invention. For example, a flush lap joint could be employed using a recess in bed mat 18, similar to that shown in FIG. 10 but in place of ridge 19, to receive lip 13. Or, another example is an interlocking ridge and channel configuration using cooperating male and female cross sections. Another example is the use of discrete protuberances and cooperating recesses. Other configurations are possible.

The upper surface of bed mat 18 has a plurality of friction pads 20 formed thereon to enhance the non-skid feature and to provide a means for water to drain beneath any cargo positioned on the mat. Additionally, the underside of bed mat 18 has a plurality of mat pads 21 formed thereon to enhance the cushioning effect of bed mat 18 and allow any water which might collect under the bed mat to drain.

Figure 7:
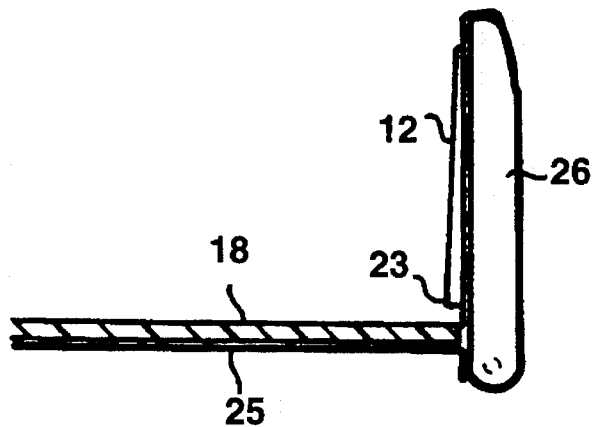
FIG. 7 is a partial sectional view showing how the tailgate cover overlaps the rear edge of the mat.

A tailgate cover 22 is provided and is formed of the same material as unitary wall member 11. Tailgate cover 22 is separately attached to truck tailgate 26 using a suitable attachment means, such as screws, rivets or the like. Tailgate cover 22 has a plurality of protruding cushioning and structural formations 12 formed thereon, similar to unitary wall member 11. Additionally, a bed mat retention lip 23 is formed to protrude along a bottom edge of tailgate cover 22. Retention lip 23 is positioned so that when tailgate 26 is in its closed upright position, retention lip 23 overlaps, in close proximity, the rear edge of bed mat 18. This overlapping feature prevents the rear edge of bed mat 18 from lifting and separating from truck bed 25 due to air turbulence. Advantageously, the formations 12 which are positioned on tail gate cover 22 are formed in the wedge shaped cross-section shown in FIG. 7 to aid in loading and unloading cargo.

Figure 8:
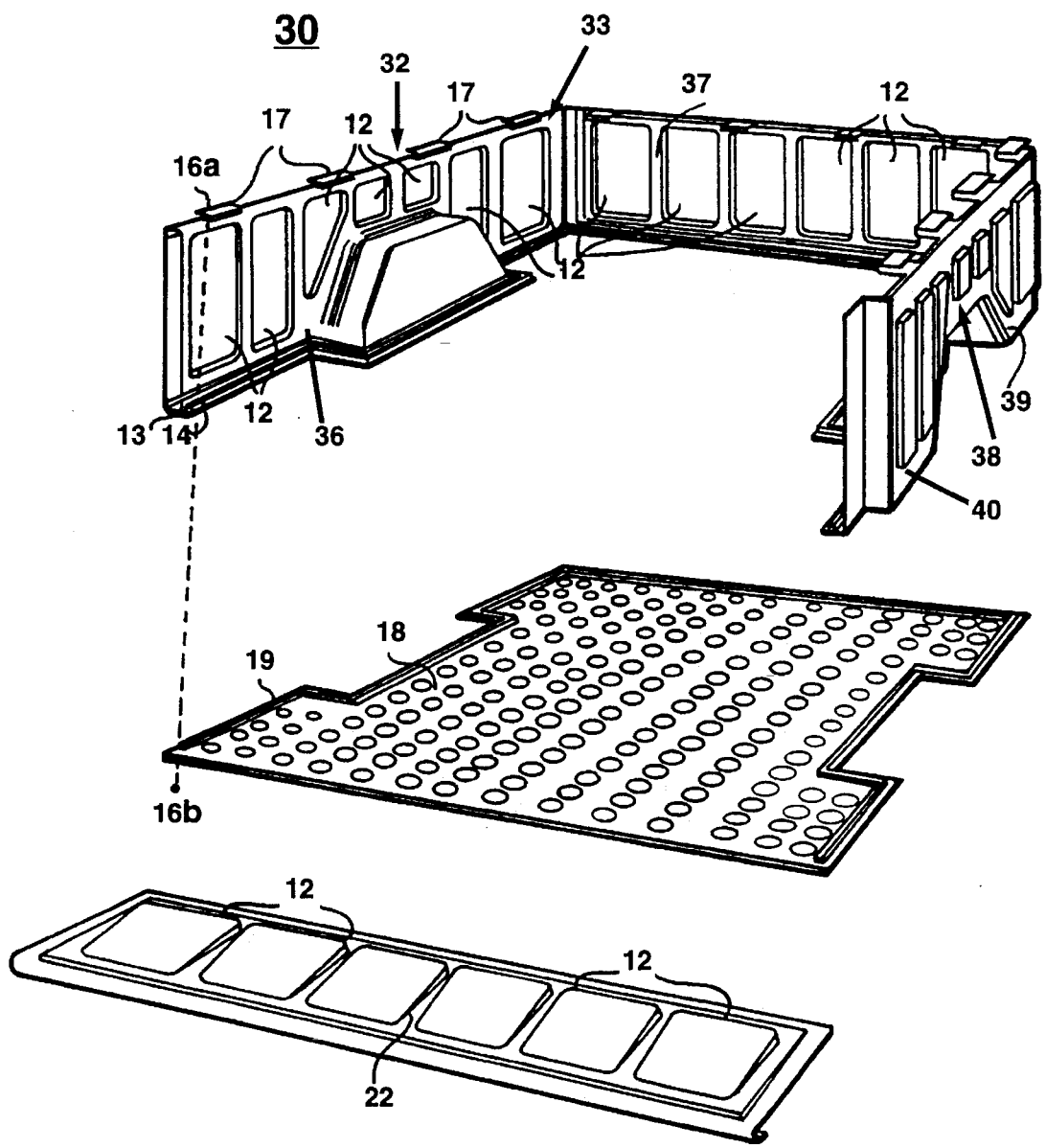
FIG. 8 is an exploded perspective view of a second embodiment of the dual composition bed liner and tailgate cover.
Figure 9:
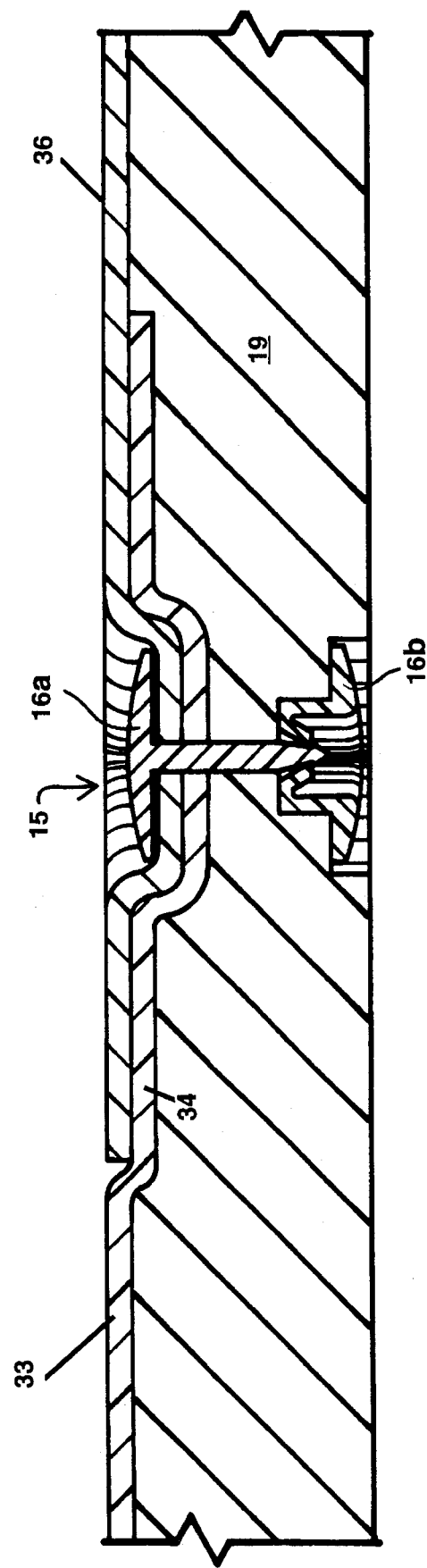
FIG. 9 is a detailed section view of the attachment of the second embodiment of the unitary wall member with the bed mat.
Figure 10:
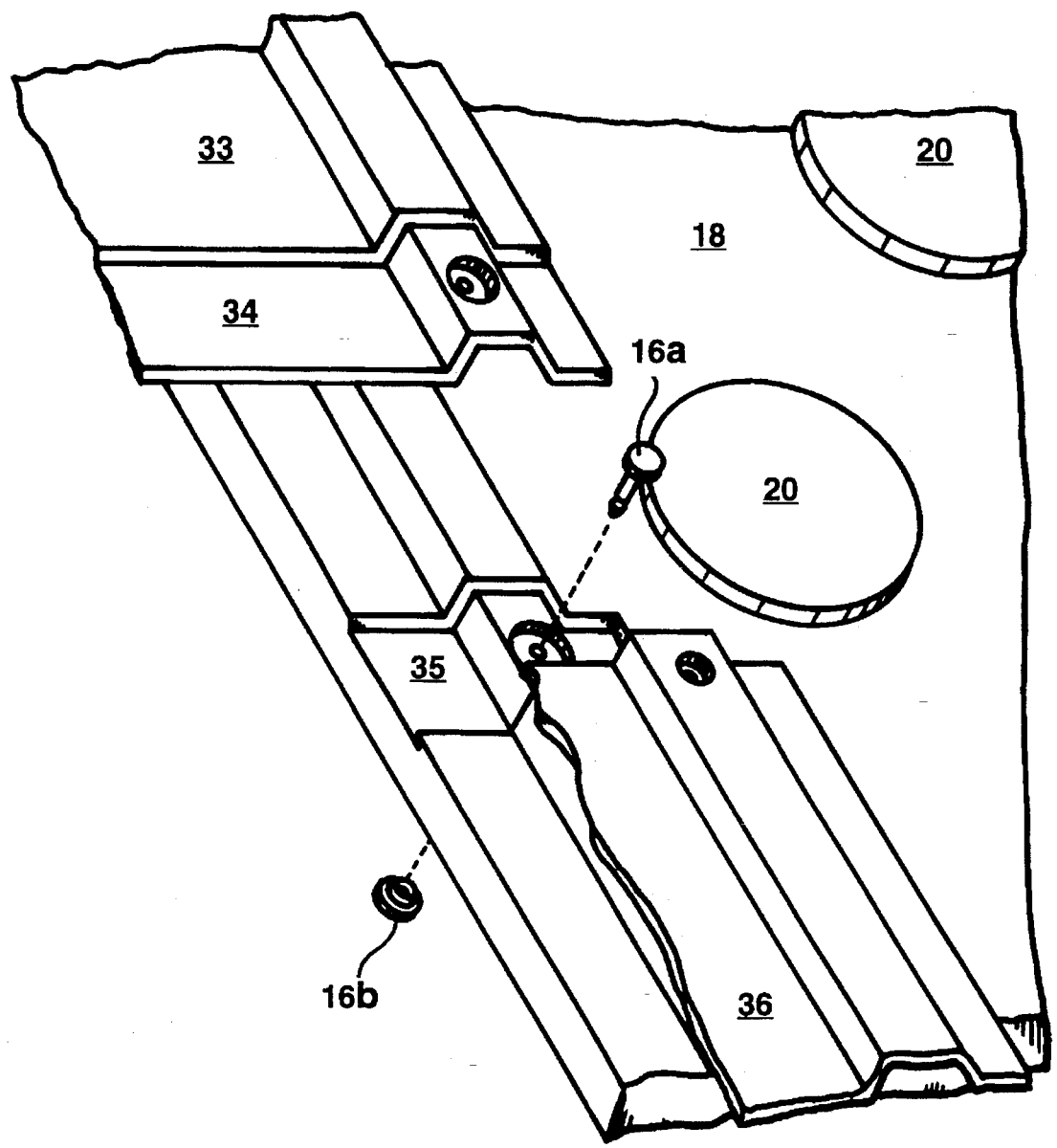
FIG. 10 is a detailed exploded view of the connection between the bed mat and unitary wall member.

A second embodiment of the dual composition bed liner designated as 30 is shown in FIGS. 8 through 10. The second embodiment of the invention has a unitary side and front wall member 30 which is constructed of multiple panels rigidly joined together. For example, left side wall 32 is constructed from a first left side panel 33 and a second left side panel 36 which are joined together by a flush lap joint. This is facilitated by a flush lap joint flange 34 extending from the rear edge of first left side panel 33 which receives the front edge of second left side panel 36. The two panels are then riveted together. Here, first left side panel 33 is formed integral with front wall 37, as is a first right side panel 39. Right side wall 38 is similarly constructed from first right side panel 39 and second right side panel 40. It should be apparent that left side wall 32, front wall 37 and right side wall 38 could all be constructed of any number of individual panels being rigidly joined together.

The multiple panel construction facilitates shipping of dual composition bed liner 30 via any carrier which has size limits which would preclude shipping the bed liner of the first embodiment. The design, construction and use of nylon snap-together rivets facilitates assembly of bed liner 30 by either the end retailer or end user. However, it should be noted that other means for fastening the panels together are possible, including for example, glue, staples, nuts and bolts, snap fit panels, mating dovetail channels, etc.

A flush lap joint flange receiving recess 35 is formed within bed mat 18 to receive and hold flush lap joint flange 34 at the lower ends of the lap joint. It should be apparent that other joints, such as a straight lap joint or butt joint can be implemented and other modifications can be made to the mat for accommodating the different joints.

Figure 11:
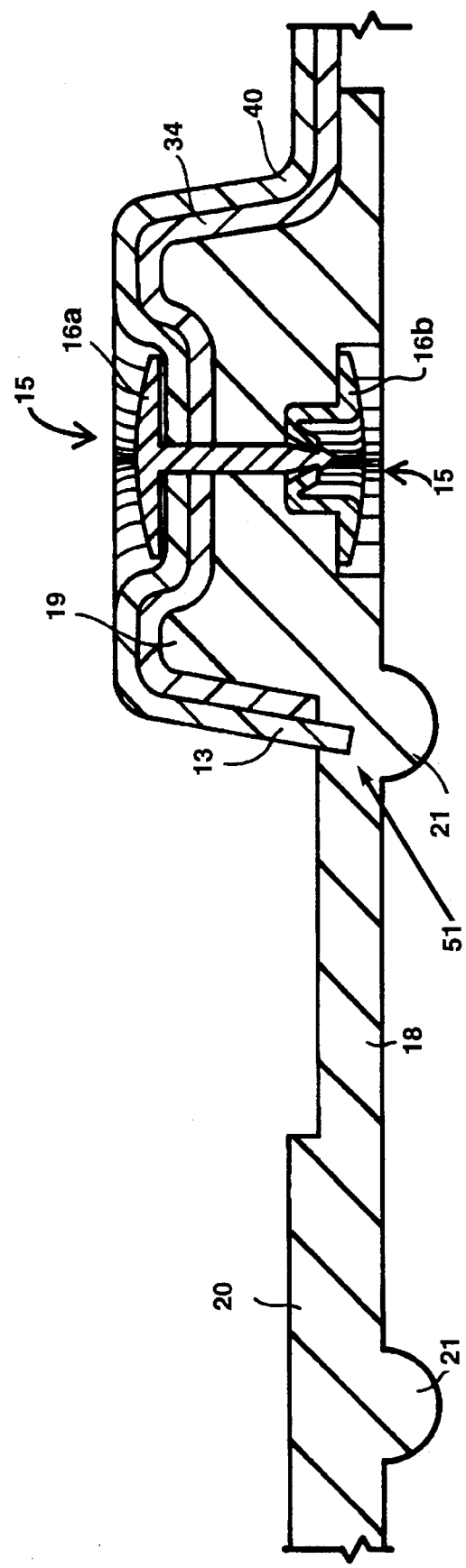
FIG. 11 is a cross section detail view of the unitary wall member and bed mat attachment of a third embodiment of the present invention.

FIG. 11 shows a third embodiment of the dual composition bed liner, which includes a lip receiving channel 51 to receive and hold bottom lip 13 of unitary side and front wall member 11. This feature inhibits foreign material from lodging between bed mat 18 and unitary side and front wall member 11.

While there is shown and described the present preferred embodiment of the invention, it is to be distinctly understood that this invention is not limited thereto but may be variously embodied to practice within the scope of the following claims.

I claim:

1. A pickup truck bed liner comprising:

a unitary wall member having: two side wails joined together by a from wall in a generally "U" shaped configuration wherein the unitary wall member is constructed from a plurality of individual panels being rigidly attached together;

a flexible and resilient bed mat being positioned between the side walls and along a bottom edge of the unitary wall member wherein the bed mat has an upper surface with a high coefficient of friction to inhibit any sliding of cargo placed thereon; and attachment means for matingly interconnecting the bed mat to the bottom edge of the unitary wall member.

2. The pickup bed liner of claim 1 wherein the attachment means includes:

a lip extending inwardly from the bottom edge of the unitary wall member, the lip having a downward facing channel formed therein extending around the inside perimeter of the unitary wall member; and a retaining ridge formed on an upper surface of the bed mat, the retaining ridge being in engagement with the channel and retained therein.

3. The pickup bed liner of claim 2 wherein the attachment means further comprises:

rivet recesses being formed in an underside of the bed mat and aligned with the retaining ridge; and rivet attachment means being positioned within the rivet recesses and extending through the bed mat and the lip, the rivet recess being deep enough to countersink the rivet attachment means therein.

4. The bed liner of claim 3 further comprising a tail gate cover being positioned opposite the front wall and juxtaposition a back edge of the bed mat.

5. The bed liner of claim 2 further comprising a tail gate cover being positioned opposite the front wall and juxtaposition a back edge of the bed mat.

6. The bed liner of claim 1 further comprising a tail gate cover being positioned opposite the front wall and juxtaposition a back edge of the bed mat.

7. The bed liner of claim 6 wherein the tail gate cover has a retaining lip protruding therefrom being positioned to closely overlap the back edge of the bed mat when the tail gate cover is in an upright position.

8. The bed liner of claim 5 wherein the tail gate cover has a retaining lip protruding therefrom being positioned to closely overlap the back edge of the bed mat when the tail gate cover is in an upright position.

9. The bed liner of claim 4 wherein the tail gate cover has a retaining lip protruding therefrom being positioned to closely overlap the back edge of the bed mat when the tail gate cover is in an upright position.

* * * * *